United States Patent
Andruska

(10) Patent No.: US 7,346,070 B2
(45) Date of Patent: Mar. 18, 2008

(54) SHARED WIRELINE CODE DIVISION MULTIPLE ACCESS

(75) Inventor: Donald Lee Andruska, Glen Ellyn, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 811 days.

(21) Appl. No.: 10/772,956

(22) Filed: Feb. 5, 2004

(65) Prior Publication Data

US 2005/0174957 A1    Aug. 11, 2005

(51) Int. Cl.
*H04B 7/216* (2006.01)
*H04B 1/00* (2006.01)

(52) U.S. Cl. .................. 370/441; 370/320; 370/324; 370/335; 370/342; 375/134; 375/135; 375/136; 375/137

(58) Field of Classification Search ............... 370/320, 370/324, 335, 342, 442; 379/90.01, 93.01; 375/134, 141, 135, 136, 137
See application file for complete search history.

(56) References Cited

FOREIGN PATENT DOCUMENTS

WO    WO 85/05745    12/1985

OTHER PUBLICATIONS

"Technology Indoor Distribution"; LEA SA, http://www.leacom.fr/home_networking_indoor_distribution.php; Dec. 30, 2003, pp. 1-2, France.

"Optical Code Division Multiple Access (OCDMA)"; Broadband Networks Group, http://www.opto.eee.strath.ac.uk/BBN/ocdma_index.html; Dec. 30, 2003, pp. 1-2, Glasgow, United Kingdom.

"Invitation for Technology Cooperation"; Muxline Isreal, Ltd.; http://www.mantimop.org.il/newrdinf/company/c4822.htm; Dec. 30, 2003, pp. 1-2, Raahana, Isreal.

Spracklen, C.T. et al., "Direct Sequence Spread Spectrum Access to Local Area Networks", Crisis Communications: The Promise and Reality, Oct. 1987, vol. 1, Conf. 6, pp. 228-232, IEEE, New York, USA.

Alexandridis, A. et al., "Use of Synchronous Code Division Multiple Access Techniques with Short Coding Sequences in the Development of a Local Communication Network", International Journal of Electronics, Jun. 1, 1990, vol. 68, No. 6, pp. 939-956, Taylor and Francis, London, GB.

Lee, J.R. et al., "A Local Area Network Based on the Code Division Multiple Access Method", Communications in the Information Age, Nov. 1984, vol. 2, pp. 648-653, IEEE, New York, USA.

*Primary Examiner*—Matthew Anderson
*Assistant Examiner*—Eugene Yun

(57) ABSTRACT

A first network component of an apparatus in one example is coupled with one or more additional network components. The first network component and the one or more additional network components communicate with one another over a single, shared wireline path through employment of a plurality of code division multiple access (CDMA) codes. The plurality of CDMA codes comprise a first CDMA code and a second CDMA code. The first network component sends a first message over the single, shared wireline path to one of the one or more additional network components through employment of the first CDMA code and contemporaneously receives a second message over the single, shared wireline path from one of the one or more additional network components through employment of the second CDMA code.

19 Claims, 1 Drawing Sheet

SHARED WIRELINE CODE DIVISION MULTIPLE ACCESS

TECHNICAL FIELD

The invention relates generally to network communication and more particularly to use of shared network communication paths.

BACKGROUND

The number of network components attached to wireline networks is growing. Limited resources and space for physical connections between network components requires shared use of the wireline paths by the network components. The network components share the wireline path through employment of a communication protocol, for example, carrier sense multiple access/collision detection (CSMA/CD). The sharing of the wireline path limits the ability of the network components to both send and receive information based on transmission status of the shared wireline path. For example, the communication protocol allows only one network component to send a message over the wireline path at one time. When two or more network components attempt to send messages over the wireline path contemporaneously through employment of the CSMA/CD protocol, the messages collide and become unintelligible. After messages collide, the network components must wait for a period of time before attempting to re-send their messages. The period of time that the network components must wait reduces transmission efficiency of the wireline path.

Thus, a need exists for an increase in transmission throughput of messages between network components that use a shared wireline path. A further need exists for increased prevention of collision of messages between network components that use a shared wireline path.

SUMMARY

In one embodiment, there is provided a method for encoding a first message through employment of an outbound-message CDMA code to create an encoded outbound first message. The encoded outbound first message is sent over a single, shared wireline path and an encoded inbound second message is contemporaneously received over the single, shared wireline path. The encoded inbound second message is decoded through employment of an inbound-message CDMA code.

In another embodiment, there is provided an apparatus comprising a first network component coupled with one or more additional network components. The first network component sends a first message encoded through employment of a first CDMA code, of a plurality of CDMA codes, over a single, shared wireline path to one of the one or more additional network components and contemporaneously receives a second message encoded through employment of a second CDMA code, of the plurality of CDMA codes, over the single, shared wireline path from one of the one or more additional network components.

In yet another embodiment, there is provided an article comprising one or more computer-readable signal-bearing media. The article includes means in the one or more media for encoding a first message through employment of an outbound-message code division multiple access (CDMA) code to create an encoded outbound first message. The article includes means in the one or more media for sending the encoded outbound first message over a single, shared wireline path and contemporaneously receiving an encoded inbound second message over the single, shared wireline path. The article includes means in the one or more media for decoding the encoded inbound second message through employment of an inbound-message CDMA code.

DESCRIPTION OF THE DRAWING

Features of exemplary implementations of the invention will become apparent from the description, the claims, and the accompanying drawing in which:

DETAILED DESCRIPTION

Figure 1:
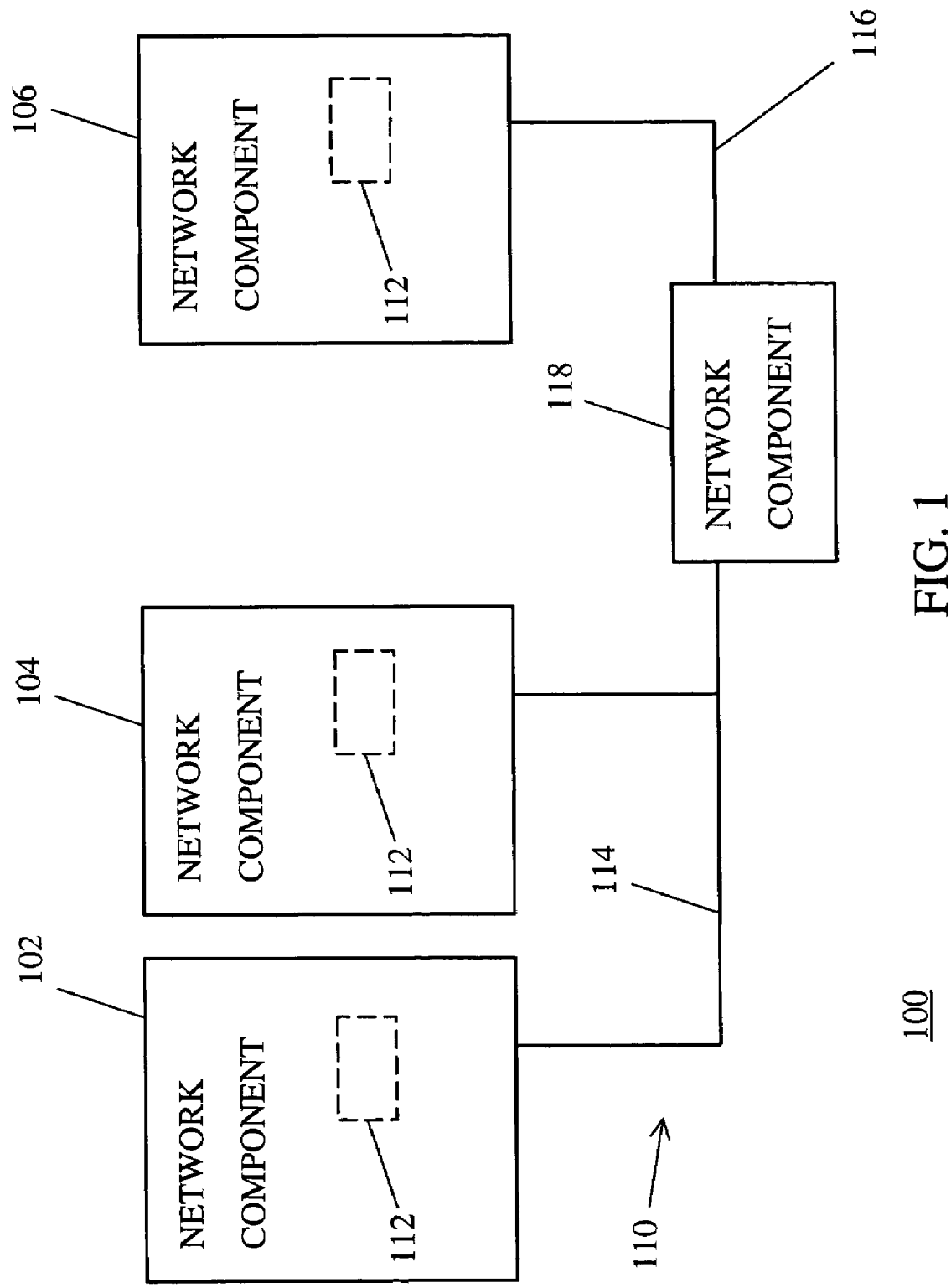
FIG. 1 is a representation of one exemplary implementation of an apparatus that comprises one or more network components and a single, shared wireline path.

Turning to FIG. 1, an apparatus 100 in one example comprises one or more network components 102, 104 and 106 and a single, shared wireline path 110. The network components 102, 104 and 106 in one example comprise personal computers, workstations, and network servers. In a further example, the network components 102, 104 and 106 comprise an instance of a recordable data storage medium 112. The network components 102, 104 and 106 in one example are connected in a wireline local area network ("LAN") through employment of the single, shared wireline path 110. For example, the network components 102, 104 and 106 communicate with one another over the single, shared wireline path 110.

The network components 102, 104 and 106 comply with a code division multiple access ("CDMA") protocol to communicate over the single, shared wireline path 110. The network components 102, 104 and 106 comprise a network interface (not shown) to the single, shared wireline path 110 that can contemporaneously both send and receive data, for example, one or more messages, over the single, shared wireline path 110. In one example, the network components 102, 104 and 106 can simultaneously send and receive the messages. The network components 102, 104 and 106 employ a plurality of CDMA codes to communicate over the single, shared wireline path 110.

The network components 102, 104 and 106 prevent collisions of messages through employment of the plurality of CDMA codes, which allows for a higher transmission efficiency over the single, shared wireline path 110. The network component 102 employs a first CDMA code, for example, an outbound-message CDMA code, to send a first message over the single, shared wireline path 110 and a second CDMA code, for example, an inbound-message CDMA code, to contemporaneously receive a second message over the single, shared wireline path 110. For example, the network component 102 encodes the first message for the network component 104 through employment of a first CDMA code. The network component 102 sends the first message over the single, shared wireline path 110 to the network component 104 and contemporaneously receives the second message over the single, shared wireline path 110. The network component 104 receives and decodes the first message through employment of the first CDMA code. The network component 102 receives and decodes the second message through employment of a second CDMA code, as will be appreciated by those skilled in the art.

The network component 102 in another example employs a first CDMA code and a second CDMA code to contemporaneously send a first message and a second message. For example, the network component 102 encodes the first message through employment of the first CDMA code and encodes the second message through employment of the second CDMA code. The network component 102 sends the first message to the network component 104 and contemporaneously sends the second message to the network component 106. Through employment of the first CDMA code and the second CDMA code, the network component 102 can send the first message and the second message contemporaneously without causing collisions, in contrast to a previous design that suffered a shortcoming of reduced throughput upon a collision.

In yet another example, the network component 102 employs a first CDMA code and a second CDMA code to contemporaneously receive a first message and a second message. For example, the network component 104 encodes the first message through employment of the first CDMA code. The network component 106 encodes the second message through employment of the second CDMA code. The network components 104 and 106 contemporaneously send the first message and the second message to the network component 102. The network component 102 decodes the first message through employment of the first CDMA code and decodes the second message through employment of the second CDMA code. The network components 104 and 106 prevent a collision of the first message and the second message by encoding and decoding the first and second messages through employment of the first and second CDMA codes, as will be appreciated by those skilled in the art.

The plurality of CDMA codes in one example comprise one or more control CDMA codes. The network components 102, 104 and 106 in one example send one or more control messages over the single, shared wireline path 110. The network components 102, 104 and 106 encode the control messages through employment of the control CDMA codes. In one example, the network component 102 manages the single, shared wireline path 110 through employment of the control CDMA messages. In a further example, the network component 102 manages allocation of the plurality of CDMA codes through employment of the control CDMA messages.

The network components 102, 104 and 106 in one example comprise a plurality of sending and receiving pairs that are unique. For example, the sending and receiving pairs comprise the network components 102 and 104, the network components 102 and 106, and the network components 104 and 106. Where the sending and receiving pair both send and receive, two CDMA codes are needed. For example, the network component 102 employs a first CDMA code when sending to the network component 104, and a second CDMA code when receiving from the network component 104. Where the first CDMA code and the second CDMA code are different, the network components 102 and 104 can send and receive messages contemporaneously. Where the other sending and receiving pairs employ different CDMA codes, all of the network components 102, 104 and 106 can send and receive between one another contemporaneously, as will be appreciated by those skilled in the art.

In one example, the one or more network components comprise a number N network components. The plurality of CDMA codes comprise a number $N^2-N$ CDMA codes. The N network components communicate with one another through employment of the $N^2-N$ CDMA codes such that a pair of the N network components employs two CDMA codes to send and receive between one another contemporaneously.

The single, shared wireline path 110 in one example comprises a coaxial cable, twisted pair cable, or optical fiber. The single, shared wireline path 110 electronically couples the network components 102, 104 and 106. The single, shared wireline path 110 in one example comprises a plurality of wireline paths, for example, wireline paths 114 and 116, that are electronically coupled by one or more network components 118, for example, network repeaters. The network component 118 in one example comprises a network switch, hub, router, or computer component with a plurality of network interfaces, as will be appreciated by those skilled in the art.

An illustrative description of exemplary operation of the apparatus 100 is presented, for explanatory purposes. The network components 102, 104 and 106 employ a plurality of CDMA codes to communicate with one another, for example, the network components 102, 104 and 106 send one or more messages over the single, shared wireline path 110. The plurality of CDMA codes comprise a first CDMA code, a second CDMA code, and a third CDMA code.

The network component 102 sends a first message over the single, shared wireline path 110 to the network component 104 through employment of the first CDMA code. The network component 102 receives a second message over the single, shared wireline path 110 from the network component 106 through employment of the second CDMA code. The network component 104 receives the first message over the single, shared wireline path 110 through employment of the first CDMA code. The network component 104 sends a third message over the single, shared wireline path 110 to the network component 106 through employment of the third CDMA code. The network component 106 sends the second message over the single, shared wireline path 110 to the network component 102 through employment of the second CDMA code. The network component 106 receives the third message over the single, shared wireline path 110 from the network component 104 through employment of the third CDMA code.

The network components 102, 104 and 106 in one example replace one or more of the plurality of CDMA codes, for example, to increase communication security of the messages or to change configurations of the wireline local area network. The plurality of CDMA codes in one example comprise a fourth CDMA code, a fifth CDMA code, and a sixth CDMA code, for example, replacement CDMA codes. The network components 102, 104 and 106 create fourth, fifth, and sixth messages that comprise the fourth CDMA code, the fifth CDMA code, and the sixth CDMA code, respectively.

The network component 102 sends the fourth message to the network component 104. The network component 104 replaces the first CDMA code with the fourth CDMA code. The network component 104 sends the fifth message to the network component 106. The network component 106 replaces the third CDMA code with the fifth CDMA code. The network component 106 sends the sixth message to the network component 102. The network component 102 replaces the second CDMA code with the sixth CDMA code.

In one example, the network component 102 sends a seventh message to the network component 104 through employment of the fourth CDMA code. The network component 104 sends an eighth message to the network component 106 through employment of the fifth CDMA code. The network component 106 sends a ninth message to the network component 102 through employment of the sixth CDMA code.

The network components 102, 104 and 106 in one example reuse one or more of the plurality of CDMA codes. For example, the network components 102, 104 and 106 create the fourth, fifth, and sixth messages that comprise the third CDMA code, the second CDMA code, and the first CDMA code, respectively. The network component 102 replaces the second CDMA code with the first CDMA code. The network component 104 replaces the first CDMA code with the third CDMA code. The network component 106 replaces the third CDMA code with the second CDMA code.

The network components 102, 104 and 106 in one example replace the first, second, and third CDMA codes at an end of a pre-determined time interval. For example, the network components 102, 104 and 106 employ the pre-determined time interval to promote synchronization between one another. A duration of the pre-determined time interval in one example comprises ten milliseconds. After the pre-determined time interval, the network components 102, 104 and 106 send the seventh, eighth, and ninth messages, as will be appreciated by those skilled in the art.

In another implementation, the network components 102 and 104 communicate through employment of the plurality of CDMA codes. The plurality of CDMA codes comprise a first CDMA code and a second CDMA code. The network component 102 sends a first message over the single, shared wireline path 110 to the network component 104 through employment of the first CDMA code. The network component 104 sends a second message over the single, shared wireline path 110 to the network component 102 through employment of the second CDMA code.

The network components 102 and 104 in one example replace one or more of the plurality of CDMA codes. In one example, the plurality of CDMA codes comprise a third CDMA code and a fourth CDMA code. The network component 102 sends a third message that comprises the third CDMA code to the network component 104. The network component 102 sends the third message to the network component 104 to replace the first CDMA code. The network component 102 receives a fourth message that comprises the fourth CDMA code from the network component 104. The network component 102 replaces the second CDMA code with the fourth CDMA code.

In one example, the network component 102 sends the third message to the network component 104 at an end of a pre-determined time interval. The network component 104 sends the fourth message to the network component 102 at the end of the pre-determined time interval. After the pre-determined time interval, the network component 102 sends a fifth message to the network component 104 through employment of the third CDMA code. The network component 104 also sends a sixth message to the network component 102 after the pre-determined time interval through employment of the fourth CDMA code.

The apparatus 100 in one example comprises a plurality of components such as one or more of electronic components, hardware components, and computer software components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art.

The apparatus 100 in one example employs one or more computer-readable signal-bearing media. Examples of a computer-readable signal-bearing medium for the apparatus 100 comprise the recordable data storage mediums 112 of the network components 102, 104 and 106. For example, the computer-readable signal-bearing medium for the apparatus 100 comprises one or more of a magnetic, electrical, optical, biological, and atomic data storage medium. In one example, the computer-readable signal-bearing medium comprises a modulated carrier signal transmitted over a network comprising or coupled with the apparatus 100, for instance, one or more of a telephone network, a local area network ("LAN"), the internet, and a wireless network.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

I claim:

1. A method, comprising the steps of:
    encoding a first message through employment of an outbound-message code division multiple access (CDMA) code to create an encoded outbound first message;
    sending the encoded outbound first message over a single, shared wire line path and contemporaneously receiving an encoded inbound second message over the single, shared wireline path; and
    decoding the encoded inbound second message through employment of an inbound-message CDMA code;
    encoding a third message through employment of the outbound-message CDMA code to create an encoded outbound third message that comprises a replacement outbound-message CDMA code; and
    sending the encoded outbound third message over the single, shared wireline path to request a replacement of the outbound-message CDMA code by the replacement outbound-message CDMA code to increase communication security of one or more additional outbound messages.

2. The method of claim 1, further comprising the steps of:
    receiving an encoded inbound fourth message over the single, shared wireline path;
    decoding the encoded inbound fourth message through employment of the inbound-message CDMA code to obtain a replacement inbound-message CDMA code; and
    replacing, after a pre-determined time interval, the inbound-message CDMA code by the replacement inbound-message CDMA code to increase communication security of one or more additional inbound messages.

3. The method of claim 2, wherein the one or more additional outbound messages comprise an outbound fifth message, the method further comprising the steps of:
    encoding the outbound fifth message through employment of the replacement outbound message CDMA code to create an encoded outbound fifth message;
    sending the encoded outbound fifth message over the single, shared wireline path and contemporaneously receiving an encoded inbound sixth message over the single, shared wireline path; and
    decoding the encoded inbound sixth message through employment of the replacement inbound-message CDMA code to obtain an inbound sixth message, wherein the one or more additional inbound messages comprise the inbound sixth message.

4. The method of claim 1, wherein the step of sending the encoded outbound first message over the single, shared wireline path and contemporaneously receiving the encoded inbound second message over the single, shared wireline path comprises the steps of:
sending the encoded outbound first message over the single, shared wireline pat at the end of a pre-determined time interval; and
receiving the encoded inbound second message over the single, shared wireline path at the end of the predetermined time interval.

5. The method of claim 1, further comprising the steps of:
encoding a third message through employment of a first control CDMA code to create an outbound encoded third message that comprises an replacement outbound-message CDMA code; and
sending the outbound encoded third message over the single, shared wireline path to request a replacement of the outbound-message CDMA by the replacement outbound-message CDMA code to increase communication security of one or more additional outbound messages.

6. The method of claim 5, further comprising the steps of:
receiving an encoded inbound fourth message over the single, shared wireline path;
decoding the encoded inbound fourth message through employment of a second control CDMA code to obtain a replacement inbound-message CDMA code; and
replacing the inbound-message CDMA code by the replacement inbound-message CDMA code to increase communication security of one or more additional inbound messages.

7. The method of claim 6, wherein a plurality of CDMA codes comprise the inbound-message CDMA code, the replacement inbound-message CDMA code, the outbound-message CDMA code, and the replacement outbound-message CDMA code, the method further comprising the step of:
managing allocation of the plurality of CDMA codes through employment of the first control CDMA code and the second control CDMA code, wherein the first control CDMA code and the second control CDMA code indicate that the encoded outbound third message and the encoded inbound fourth message comprise management messages.

8. The method of claim 1, wherein the step of sending the encoded outbound first message over the single, shared wireline pat and contemporaneously receiving the encoded inbound second message over the single, shared wireline path comprises the steps of:
sending the encoded outbound first message over the single, shared wireline path to a network component of a sending and receiving pair; and
receiving the encoded inbound second message over the single, shared wireline path from the network component of the sending and receiving pair.

9. The method of claim 1, wherein the sending the encoded outbound first message over the single, shared wireline path and contemporaneously receiving the encoded inbound second message over the single, shared wireline path comprises the steps of:
sending one or more encoded outbound messages over the single, shared wireline path to a respective first one or more network components; and receiving one or more encoded inbound messages over the single, shred wireline path from a respective second one or more network components;
wherein the step of decoding the encoded inbound second message through employment of the inbound-message CDMA code comprises the step of:
decoding the one or more encoded inbound messages through employment of a respective second one or more inbound-message CDMA codes.

10. The method of claim 1, further comprising the step of:
preventing a collision of the encoded outbound first message and the encoded inbound second message by encoding to encoded outbound first message through employment of the outbound-message CDMA code and decoding the encoded inbound second message through employment of the inbound-message CDMA code.

11. The method of claim 1, wherein the step of sending the encoded outbound first message over the single, shared wireline path and contemporaneously receiving the encoded inbound second message over the single, shared wireline path comprises the step of:
sending the encoded outbound first message over the single, shared wireline path and simultaneously receiving the encoded inbound second message over the single, shared wireline path.

12. An apparatus, comprising:
a first network component coupled with one or more additional network components that sends a first message encoded through employment of a first CDMA code, of a plurality of CDMA codes, over a single, shared wireline path to one of the one or more additional network components and contemporaneously receives a second message encoded through employment of a second CDMA code, of the plurality of CDMA codes, over the single, shared wireline path from one of the one or more additional network components;
wherein the first network component sends, after a predetermined time interval, a third message encoded through employment of the first CDMA code, of the plurality of CDMA codes, over the single, shared wireline path to the one of the one or more additional network components:
wherein the third message comprises a third CDMA code, of the plurality of CDMA codes, for replacement of the first CDMA code.

13. The apparatus of claim 12, wherein the first network component cooperates with one or more of the one or more additional network components to prevent one or more collisions of a plurality of messages on the single, shared wireline path through employment of one or more of the plurality of CDMA codes, wherein the plurality of messages comprise the first message and the second message.

14. The apparatus of claim 12, wherein the first network component sends one or more control messages over the single, shared wireline path to the one or more additional network components through employment of one or more control CDMA codes, of the plurality of CDMA codes, to manage communication of a plurality of messages over the single, shared wireline path.

15. The apparatus of claim 12, wherein the first network component sends the first message encoded through employment of the first CDMA code over the single, shared wireline path to a second network component of the one or more additional network components and contemporaneously receives the second message encoded through employment of the second CDMA code over the single, shared wireline path from the second network component.

16. The apparatus of claim 12, wherein the first network component sends the first message encoded through employment of the first CDMA code over the single, shared wireline path to a second network component of the one or more additional network components and contemporaneously receives the second message encoded through employment of the second CDMA code over the single, shared wireline path from a third network component of the one or more additional network components.

17. The apparatus of claim 16 in combination with the second network component;
   wherein the first network component encodes a third message to create an encoded third message that comprises a replacement third CDMA code of the plurality of CDMA codes;
   wherein the first network component sends the encoded third message to the second network component;
   wherein the second network component decodes the third encoded message through employment of the first CDMA code and replaces the first CDMA code with the replacement third CDMA code;
   wherein the second network component encodes a fourth message through employment of the second CDMA code to create an encoded fourth message that comprises a replacement fourth CDMA code of the plurality of CDMA codes;
   wherein the second network component sends the encoded fourth message to the first network component;
   wherein the first network component decodes the fourth message through employment of the second CDMA code and replaces the second CDMA code with the replacement fourth CDMA code.

18. An article, comprising:
one or more computer-readable signal-bearing media; and
means in the one or more media for encoding a first message through employment of an outbound-message code division multiple access (CDMA) code to create an encoded outbound first message;

means in the one or more media for sending the encoded outbound first message over a single, shared wireline path and contemporaneously receiving an encoded inbound second message over the single, shared wireline path; and means in the one or more media for decoding the encoded inbound second message through employment of an inbound-message CDMA code;

means in the one or more media for encoding a third message through employment of the outbound-message CDMA code to create an encoded outbound third message that comprises a replacement outbound-message CDMA code;

means in the one or more media for sending the encoded outbound third message over the single, shared wireline oath to request a replacement of the outbound-message CDMA code by the replacement outbound-message CDMA code to increase communication security of one or more additional outbound messages.

19. The article of claim 18, further comprising:

means in the one or more media for receiving an encoded inbound fourth message over the single, shared wireline path;

means in the one or more media for decoding the encoded inbound fourth message through employment of the inbound-message CDMA code to obtain a replacement inbound-message CDMA code; and means in the one or more media for replacing the inbound-message CDMA code by the replacement inbound-message CDMA code to increase communication security of one or more additional inbound messages.

* * * * *